US006227161B1

(12) United States Patent
Urushiyama

(10) Patent No.: US 6,227,161 B1
(45) Date of Patent: May 8, 2001

(54) PISTON-CRANK MECHANISM

(76) Inventor: Goro Urushiyama, 288-5, Maekawa, Odawara-shi, Kanagawa-ken (JP)

( * ) Notice: Subject to any disclaimer, the term of this patent is extended or adjusted under 35 U.S.C. 154(b) by 0 days.

(21) Appl. No.: 09/461,008

(22) Filed: Dec. 15, 1999

(30) Foreign Application Priority Data

Aug. 2, 1999 (JP) ........................................ 11-219169

(51) Int. Cl.[7] ........................................ F16H 21/18

(52) U.S. Cl. ........................................ 123/197.4

(58) Field of Search .............................. 123/197.1, 197.3, 123/197.4; 74/579 R, 579 E, 581

(56) References Cited

FOREIGN PATENT DOCUMENTS 2958310 7/1999 (JP) .
WO 9005862 * 5/1990 (WO).

* cited by examiner

*Primary Examiner*—Henry C Yuen
*Assistant Examiner*—Hyder Ali
(74) *Attorney, Agent, or Firm*—Dickstein Shapiro Morin & Oshinsky LLP

(57) ABSTRACT

A free-link, one end thereof being pivoted on the piston pin while the other end thereof being pivoted on the cross-link, is restrained by swinging movement of the cross-link about the pivoting point on the crankcase, so that in an intermediate position of the reciprocating movement of the piston, the inclination of the free-link to the reciprocating direction of the piston (the piston axial line direction) is set to be small while the straight line connecting the top and bottom dead centers of the crank pin together meets approximately at a right angle with the straight line connecting the pivoting point of the cross-link on the crankcase to the pivoting point thereof on the connection rod. Thereby, wear and tear on the sliding surfaces due to the frictional loads on the sliding surface between the piston/cylinder and on the crank pin are reduced and loss of transmission power is also reduced.

8 Claims, 7 Drawing Sheets

PISTON-CRANK MECHANISM

BACKGROUND OF THE INVENTION

1. Field of the Invention

The present invention relates to a piston-crank mechanism for use in automobile engines and so forth.

2. Description of the Related Art

Piston-crank mechanisms for converting reciprocating movement of a piston into rotational movement have been widely used in steam engines since the invention up to contemporary automobile engines. This piston-crank mechanism has sliding portions such as the sliding surface between the cylinder and the piston and bearing portions of crank pins, which produce frictional resistance forces, so that power loses due to severe variations in load, variations in frictional forces, and generation of heat are increased. These are known as causes of reduced transmission efficiencies and hastening of wear and tear in the piston, the cylinder, bearings, etc.

In order to improve the transmission efficiencies and prevent wear and tear in the piston, the cylinder, bearings, etc., various improvements in materials, structures, lubrication, cooling, and so forth have been conventionally made. A conventional piston-crank mechanism has been basically a structure shown in FIG. 7; however no innovative improvements on this mechanism have been made.

In a structure of a conventional piston-crank mechanism for one cylinder, as schematically shown in FIGS. 7*a* to 7*d*, a piston 101, a piston rod 106, and a crankshaft 103 are arranged on one straight line. At the top dead center of the piston 101 (FIG. 7*a*), a cylinder chamber 102 is just before the explosion process or the suction process while at the bottom dead center (FIG. 7*c*) is just before the exhaustion process or the compression process, and the piston 101 at both the positions is in an almost stationary state. In these positions, the crankshaft 103 is rotated in the "A" direction owing to the explosive force of another cylinder or inertial forces of the crankshaft 103 and a crank arm 104 integrated in the crankshaft 103; the bending moment is scarcely applied to the piston rod 106 and neither the side pressure nor the frictional force due to the side pressure are applied to the sliding surface "D" between the cylinder 102 and the piston 101 because connecting portions between the crank arm 104 and the connection rod 105 and between the connection rod 105 and the piston rod 106 are pivoted with a crank pin 107 and a piston pin 108, respectively.

On the other hand, in an intermediate position from the top to the bottom of the piston stroke (FIG. 7*b*), the rotation "A" of the crankshaft 103 mainly depends on the downward thrust of the piston 101 shown in the drawing, i.e., explosive forces in the cylinder 102, in the explosion process. At this time, the rotational force is applied to the crank arm 104 via the connection rod 105 which is much inclined "θ" toward the piston rod 106. Since the piston rod 106 is fixed to the piston 101 in unison, the reaction force of the rotational driving force strongly pushing the crank arm 104 with the connection rod 105 is applied to the piston pin 108 to apply the bending moment to the piston rod 106. Thereby, the high side pressure and the frictional force accompanied thereby are applied to the sliding surface As shown in "P01" of FIG. 8 illustrating variations in the side pressure and the frictional force due to the side pressure in the crank pin 107, pressures are low in the top and bottom dead centers (FIGS. 7*a* and 7*c*) while is high in the intermediate position (FIG. 7*b*) of the explosion process.

In the suction process of the piston-cylinder, the driving direction is switched so that the crank arm 104 drives the connection rod 105 which in turn pushes up the piston rod 106 in the axial direction thereof. At this time, the side pressure and the frictional force accompanied thereby are applied to the sliding surface "D" by the inclination "θ" of the connection rod 105 to the piston rod 106. Since the resistance force against the suction is smaller than the driving force from the crank arm 104, the pressure is rather lower as shown in "P02" of FIG. 8; however just like "P01", the maximum pressure is shown in the intermediate position of the stroke of the piston 101.

In FIG. 7*d* that is the exhaustion process or the compression process of the piston 101, the crank arm 104 is rotated in the "A" direction of the crankshaft 103 owing to the explosive force of another cylinder or inertial forces of the crankshaft 103 or a crank arm 104 so as to push the sliding portion of the crank pin 107 which is the connecting portion to the connecting rod 105. Since this pushing force is used only for the exhaustion or the compression by pushing up the connecting rod 105, the piston rod 106, and the piston 101, it is not so large as that in the explosion process, resulting in the same line "P02" as that of the suction process.

Among respective processes of suction, compression, explosion, and exhaustion, in the intermediate positions (FIGS. 7*b* and 7*d*) in which the speed of the piston 101 is the highest, the side pressure/the frictional force in the sliding surface "D" between the piston 101 and the cylinder 102 is the maximum as shown in FIG. 8.

The above-mentioned problem of the side pressure/the frictional force in the sliding surface "D" between the piston 101 and the cylinder 102 also arises almost similarly in a piston-crank mechanism for use in fuel-injection-type engines in which suction and compression of fuel are not performed.

As described above, in the conventional piston-crank mechanism, since in the intermediate positions in which the speed of the piston 101 is the highest, the side pressure/the frictional force in the sliding surface "D" between the piston 101 and the cylinder 102 is the maximum, the cylinder 102 and the piston 101 sliding within the cylinder 102 have to tolerate the extremely severe state. In particular, in the intermediate portion of the cylinder 102, the speed and the side pressure/the frictional force of the piston 101 are the maximums, so that the state thereof is most severe.

When a piston-cylinder after long term use or having scoring is disassembled, the intermediate portion "C" of the cylinder 102 and the sliding surface "D" of the piston 101 are severely damaged as shown in FIG. 9*a*, so that the severe state in which the speed and the side pressure/the frictional force of the piston 101 are the maximums can be supposed. The speed and the side pressure/the frictional force of the piston 101 not only reduce an operating life of the piston 101-cylinder 102 but also deteriorate the transmission efficiency of the piston-cylinder mechanism and engine efficiencies because some engine power is consumed by the useless side pressure/the frictional force.

On the other hand, when the piston 101 approaches the top and bottom dead centers of the reciprocating stroke thereof, the frictional force in the sliding surface "D" between the piston 101 and the cylinder 102 is small so as to bring about such a state that brakes are not applied to overrunning of the piston 101. Therefore, the crank arm 104 is meaninglessly pushed and pulled in the top and bottom dead centers, so that bearings of the crankshaft 103, the crank pin 107, and the piston pin 108 are laterally pressed on impact to be hastened to damages of these parts in vain.

When a crank pin after long term use or having scoring is disassembled, the damaged surfaces "E" of the crank pin 107 are concentrated in an angular position in which the above-mentioned impact is produced, as shown in FIG. 9*b*, thereby, the above-mentioned situation can be confirmed. This impactive force also reduces the transmission efficiency of the piston-cylinder mechanism and engine efficiencies by consuming some engine power.

The above-mentioned arrangement of the piston 101, the piston rod 106, and the crankshaft 103 on one straight line has been also a restriction on engine design.

In order to solve the above-mentioned problems, the inventor of the present invention invented a novel piston-crank mechanism earlier, so that Japanese Patent No. 2958310 was granted, which was issued Oct. 6, 1999. In the piston-crank mechanism according to Japanese Patent No. 2958310, a guide link swingably pivoted on a fixed point and a piston rod are connected with a free link while a connecting rod is pivoted on the guide link, wherein respective links are arranged and connected so that in an intermediate position of the stroke of a piston, the pivoting point between the free link and the guide link agrees with or approaches an axial line of the piston.

SUMMARY OF THE INVENTION

The present invention is made by furthermore improving Japanese Patent No. 222077 to provide a piston-crank mechanism in which the side pressure/the frictional force in the sliding surface between a piston and a cylinder in an intermediate position of the stroke of the piston is small while impactive forces in the top and bottom dead centers are also small, so that reciprocating movement of the piston can be smoothly converted into rotational movement of a crankshaft and moreover restrictions in arrangements of the piston-cylinder and the crankshaft are solved.

The present invention according to features thereof provides a piston-crank mechanism in which a cross-link swingably pivoted on one point of a crankcase defines the range of motion of (plural) links between a piston and a crankshaft, so that in an intermediate position of the stroke of the piston, in which the speed of the piston is the highest, the straight line connecting the top and bottom dead centers of a crank pin together meets approximately at a right angle with the straight line connecting the pivoting point of the cross-link on the crankcase to the pivoting point thereof on a connection rod.

In the above-mentioned state that the line connecting the top and bottom dead centers together meets at a right angle with the line connecting the pivoting points together, the reaction force applied to the connection rod from a crank arm is the smallest in the reciprocating cycle; therefore the side pressure/the friction force applied to between the piston and the cylinder is decreased. That is, the load in the most severe sliding state at the highest speed in the piston stroke is reduced. In this position, the side pressure/the friction force applied to between the piston and the connection rod is also reduced.

A free link, one of the (plural) links, is pivoted to a piston rod; in an intermediate position of the piston stroke, the inclination of the free link axial line to the piston axial line is maintained to be small, so that the side pressure/the friction force applied to between the piston and the cylinder is furthermore securely reduced. It is effective for this maintaining to set a ratio of the distance between the free link pivoting point of the cross-link and the pivoting point thereof on the crankcase/the distance of the piston stroke to be sufficiently large or to use the so-called Watt-link mechanism generating a pseudo-straight-line locus. Moreover, when the inclination of the free link axial line to the piston axial line is not too large over the whole stroke of the piston including the top and bottom dead centers, the load between the piston and the cylinder is preferably reduced; the restriction by swinging movement of the cross-link contributes to this situation. When the free-link pivoting point of the cross-link and the pivoting point thereof on the connection rod are arranged on the same pitch circle about the pivoting point on the crankcase and are spaced in predetermined relationship, the above-mentioned inclination is small over the whole piston stroke and the inclinations at the top and bottom dead centers, which are the maximums, can be roughly the same.

According to the present invention, the following kind of piston-crank mechanisms, which have been conventionally difficult to be achieved, can be easily achieved.

A piston-crank mechanism in which the piston axial line does not intersect the crankshaft axial line but is offset to it.

A piston-crank mechanism in which the piston axial line is not parallel with the line connecting the top and bottom dead centers of the crank pin together but is inclined to each other.

A piston-crank mechanism in which the crankshaft is arranged between the piston axial line and the pivoting point of the cross-link on the crankcase.

The present invention having flexibility in a layout as described above enables the engine to be compact with a short crank arm, lightweight, with a high rotational speed, and high-power. The load applied to the crank pin can be also reduced by elongating the connection rod.

BRIEF DESCRIPTION OF THE DRAWINGS

FIGS. 1*a* to 1*c* are schematic representations of the piston-crank mechanism according to a first embodiment of the present invention while FIG. 1*a* shows the state in the top dead center, FIG. 1*b* shows the state in an intermediate position from the top dead center to the bottom dead center, and FIG. 1*c* shows the state in the bottom dead center.

FIGS. 2*a* to 2*c* are schematic representations of the piston-crank mechanism according to a second embodiment of the present invention while FIG. 2*a* shows the state in the top dead center, FIG. 2*b* shows the state in an intermediate position from the top dead center to the bottom dead center, and FIG. 2*c* shows the state in the bottom dead center.

FIGS. 7*a* to 7*d* are schematic representations of a conventional piston-crank mechanism while FIG. 7*a* shows the state in the top dead center, FIG. 7*b* shows the state in an intermediate position from the top dead center to the bottom dead center, FIG. 7*c* shows the state in the bottom dead center, and FIG. 7*d* shows the state in an intermediate position from the bottom dead center to the top dead center.

FIGS. 9*a* and 9*b* are perspective views showing damaged states of an engine utilizing a conventional piston-crank mechanism while FIG. 9*a* shows damaged states of the piston and the cylinder and Fog. 9*b* shows damaged states of the crank pin and the bearing to be fitted thereon.

DESCRIPTION OF THE PREFERRED EMBODIMENTS

Embodiments of the present invention will be described with reference to the drawings below.

<First Embodiment>

Figure 1A:
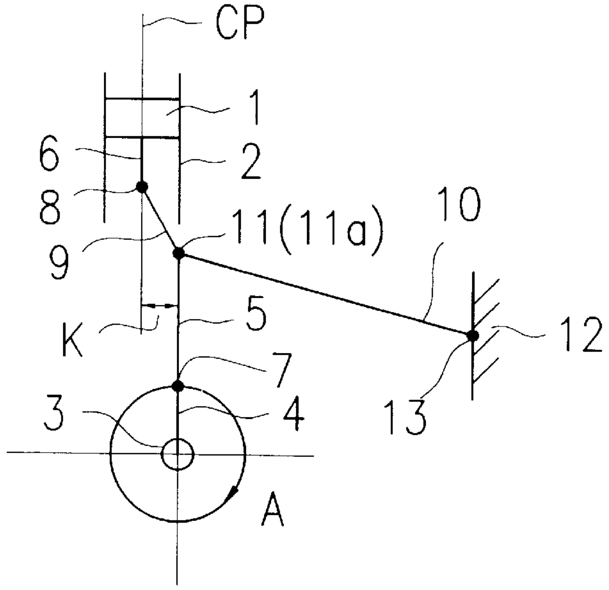
Figure 1B:
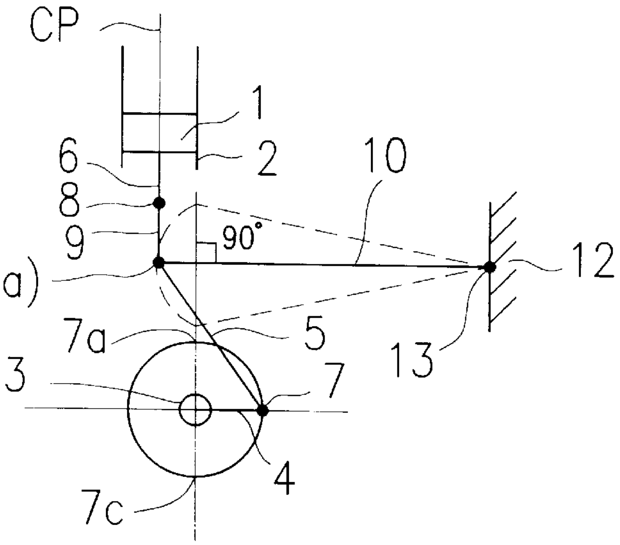
Figure 1C:
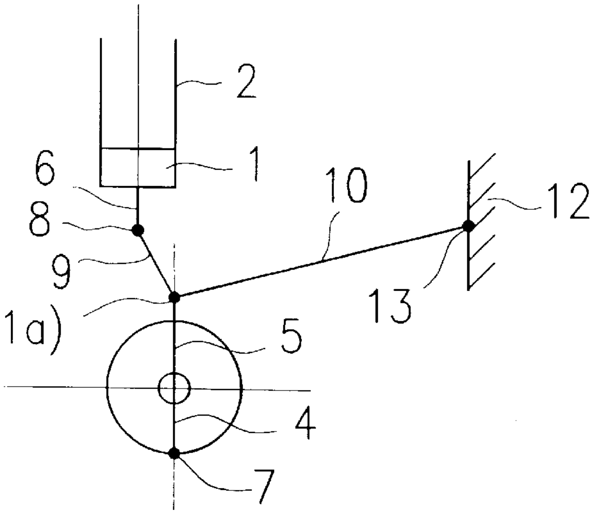

FIGS. 1*a* to 1*c* are schematic representations showing a first embodiment of a piston-crank mechanism according to the present invention. A piston 1 is reciprocatablly in contact with an inner diameter of a cylinder 2. It is the same as conventional piston-crank mechanisms that reciprocating movement of the piston 1 in the cylinder 2 be performed corresponding to respective processes of an engine that are suction, compression, and explosion of fuel gas and exhaustion of the burned gas.

There are shown a crankshaft 3, a crank arm 4, a connecting rod 5, and a piston rod 6. The crankshaft 3, to which the crank arm 4 is fixed, is rotatably and detachably supported on bearings (not shown). At the end portion of the crank arm 4, a crank pin 7 is disposed, over which a bearing portion disposed at one end of the connecting rod 5 is rotatably fitted to be pivotably mounted thereon. The crankshaft 3 is offset a distance "K" from the piston axis "Cp" of the piston 1 and the piston rod 6 (these are referred to as a piston portion in this specification) other than being arranged on the axis "Cp".

The piston rod 6 is unitarily formed with the bottom portion of the piston 1 to form the piston portion with the piston 1. At the end of the piston rod 6, a piston pin 8 is disposed. In addition, the piston rod 6 may be omitted so that the piston pin 8 is directly disposed in the piston 1. These respects are also identical with conventional piston-crank mechanisms.

The piston pin 8 is arranged on or close to the axial line "Cp" of the piston 1 and prevents the piston 1 from being applied by a turning moment about an axis orthogonal to the axial line "CP" when an external force is applied in the direction of the axial line "Cp" via the piston pin 8. If the moment was applied, useless lateral pressure to the sliding surface between the piston 1 and the cylinder 2 should be applied.

On the end of the piston rod 6, one end of a free-link 9 is pivotally mounted via the piston pin 8, while the other end of the free-link 9 is pivotally mounted on one end of a cross-link 10 (at a pivoting point 11). The other end of the cross-link 10 is pivotally mounted on one side of a crankcase 12 surrounding the crankshaft 3 (at a pivoting point 13). The other end of the above-mentioned connection rod 5 is pivotally mounted to the pivoting point 11 between the cross-link 10 and the free-link 9.

Since at the above-mentioned pivoting points 7, 8, 11, and 13, each link is swingable with each other, the free-link 9, the cross-link 10, and the connection rod 5 swing in accordance with reciprocating movement of the piston 1 in the cylinder 2 to thereby rotate the crankshaft 3 being unitary with the crank arm 4 and journaled on the bearings (not shown).

When the piston 1 is positioned at an intermediate position between the top dead center and the bottom dead center in the reciprocating stroke thereof, as shown in FIG. 1*b*, the inclination of a free-link axial line "C9" connecting the pivoting point 8 of the free-link 9 on the piston rod 6 and the pivoting point 11 thereof on the cross-link 10 to the reciprocating direction of the piston 1 (the piston axial line "Cp" direction) is intended to be small.

In the first embodiment shown in FIG. 1, the cross-link 10 and the connection rod 5 form an intermediate link mechanism for transmitting reciprocating movement of the piston portion 1, 6 to the crankshaft 3. The cross-link 10 and the connection rod 5 are a link for transmitting reciprocating movement of the piston thereto.

In the crankshaft 3, plural sets of the piston-cylinder mechanism shown in FIG. 1 are arranged with the piston 1-the crank arm 4 mechanisms phase shifted just like conventional multi-cylinder engines.

Next, operations of the piston-crank mechanism shown in FIG. 1 will be sequentially described along processes of suction, compression, and explosion of fuel gas and exhaustion of the burned gas of an engine.

FIG. 1*a* shows a state in which the crank is at the top dead center while proceeding to the process of explosion of fuel gas from compression or proceeding to suction of new fuel gas from exhaustion of the burned gas.

To reach this state, the connection rod 5 is pushed up so that the cross-link 10 is swung about the pivoting point 13 as a fulcrum upwardly viewed in the drawing by means of rotation of the crankshaft 3 in the "A" direction owing to the rotational driving force of another piston-crank mechanism (not shown) arranged in the same crankshaft 3 or a secondary inertial force from rotational driving in the previous explosion process. Accordingly, the piston 1 is pushed up via the piston rod 6 so that the fuel gas in the cylinder 2 is compressed or the burned fuel gas is exhausted. Until the state of FIG. 1A which is the end of the explosion process or the exhaustion process, an upwardly high speed from the high speed rotation of the crankshaft 3 is applied to the piston 1, such that the speed is suppressed with the crank arm 4 and the pressure of compressed gas in addition thereto in the compression process while large loads in the direction opposite to that of when being driven are applied to the pivoting points 8, 11, and 7 of each of links.

Figure 8:
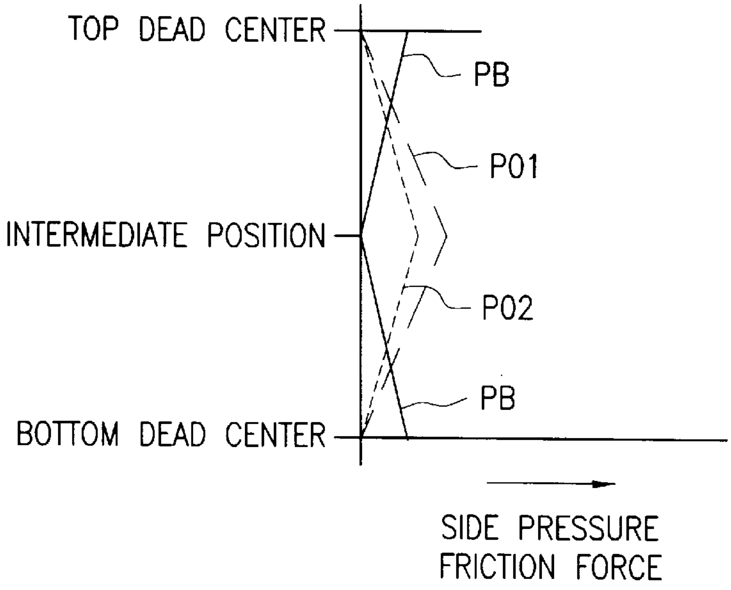
FIG. 8 is a schematic representation illustrating variations of the side pressure/the frictional force applied to the crank rod of the piston-crank mechanism over the stroke by comparing the piston-crank mechanism according to the present invention with a conventional one.
Figure 9A:
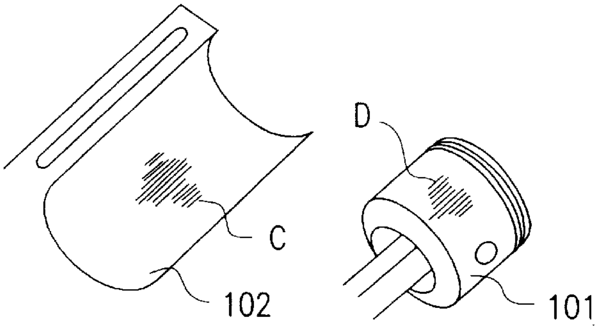
FIG. 9(a) PRIOR ART
Figure 9B:
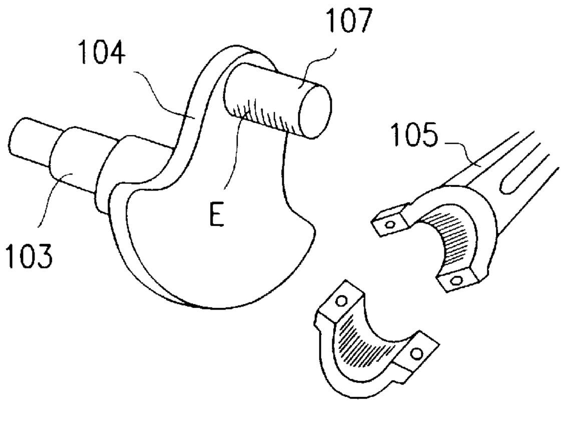
FIG. 9(b) PRIOR ART

In the vicinity of the top dead center shown in FIG. 1*a,* the angle "θ" which the free-link axis "C9" connecting the pivoting point 8 of the free-link 9 to the pivoting point 11 of the cross-link 10 forms the reciprocating direction of the piston 1 (the piston axis "Cp" direction) is not zero, such that the direction of the suppression force downwardly applied to the piston 1 from the free-link 9 is inclined with the vertical direction at "θ" (in the conventional piston-crank mechanism shown in FIG. 7, it is the vertical direction). Due to this inclination, a turning moment about an axis orthogonal to the piston axis "Cp" is applied to the piston 1, so that lateral pressure in the sliding surface "D" between the piston 1 and the cylinder 2 is applied producing a friction force by sliding ("PB" in FIG. 8). Since this friction force assists the above-mentioned suppression force the loads to the pivoting points 8, 11, and 7 of each of links are reduced as much for that.

When the crankshaft 3 further rotates in the "A" direction from the state of FIG. 1*a* to proceed to the explosion process or the suction process, the inclination "θ" of the free-link 9 decreases gradually with accompanying decrease in the side pressure/the friction force in the sliding surface "D" . In the explosion process, the piston 1 powerfully pushes down the piston rod 6, the free-link 9, the connection rod 5, and the crank arm 4 in the downward direction in the drawing to rotate the crankshaft 3 in the "A" direction. In the suction process, the crank arm 4, the connection rod 5, the free-link 9, and the piston 1 are downwardly pushed by the rotation of the crankshaft 3 in the "A" direction owing to the rotational driving force of another piston-crank mechanism or the secondary inertial force.

In any of the cases, in the vicinity of the top dead center shown in FIG. 1*a*, the side pressure/the friction force in the sliding surface "D" is large; however at the intermediate position of the stroke of the piston portion (the position shown in FIG. 1*b*), by virtue of swinging of the cross-link 10 about the pivoting point 13 on the crankcase 12 (movement along a predetermined locus which is an arc around the pivoting point 13 as the center), the inclination of the free-link axial line "C9" to the piston axial line "Cp" is extremely small. Therefore, in the vicinity of the position shown in FIG. 1*b* where the crankshaft 3 is most accelerated, the free-link axial line "C9" roughly matches with the direction of reciprocating movement of the piston 1 (the piston axial line "Cp" direction) so that the inclination "θ" of the free-link 9 to the piston rod 6 is to be approximately zero and the side pressure in the sliding surface "D" between the piston 1 and the cylinder 2 is to be theoretically zero, resulting in no frictional resistance therebetween. Therefore, in the vicinity of the position shown in FIG. 1*b* where the piston 1 outputs the maximum power, the piston 1 smoothly drives the crankshaft 3 with extreme efficiencies.

As the piston 1 proceeds toward the bottom dead center shown in FIG. 1*c*, the cross-link 10 further swings so that the pivoting point 11 between the cross-link 10 and the free-link 9 is separated from the piston axial line "Cp" at this time so that the inclination "θ" of the free-link 9 to the piston rod 6 starts to increase to thereby increase the side pressure/the frictional resistance in the sliding surface "D". Accordingly, a suppression force toward the bottom dead center is produced so as to act effectively on reversing movement of the piston 1 from descending to ascending.

A proceeding state from the bottom dead center shown in FIG. 1*c* toward the position shown in FIG. 1*a* entering into the exhaust process or the compression process is an intermediate point of the process of accelerating the piston 1, although illustration is omitted. Like in the vicinity of the position shown in FIG. 1*b*, the free-link axial line "C9" of the free-link 9 roughly matches with the direction of reciprocating movement of the piston 1 (the piston axial line "Cp" direction) so that the inclination "θ" of the free-link 9 to the piston rod 6 is to be approximately zero and the side pressure in the sliding surface "D" between the piston 1 and the cylinder 2 is to be theoretically zero, resulting in no frictional resistance therebetween. Therefore, the piston 1 smoothly and efficiently moves upward without being prevented by the side pressure/the frictional resistance in the sliding surface "D". Then when the piston 1 approaches the top dead center, the side pressure/the frictional resistance in the sliding surface "D" increases to act as a suppressing force, as described above.

As described above, in the embodiment shown in FIGS. 1*a* to 1*c*, at the intermediate position of the stroke of the piston portion, the inclination of the free-link axis "C9" to the piston axial line "Cp" is small, so that the side pressure/ the frictional resistance in the sliding surface "D" is to be zero, and a connecting straight line between the top and bottom dead centers "Cb" and "Cd" of the crank pin meets approximately at a right angle with a straight line connecting the pivoting point 13 of the cross-link 10 on the crankcase 12 to the pivoting point lla on the connection rod 5, so that the load to the bearing of each pivoting point is restrained from being excessive. On the other hand, in the top and the bottom dead center, the side pressure/the frictional resistance in the sliding surface "D" is appropriately produced enabling the piston 1 to be smoothly reciprocated with extreme efficiencies, so that loss of energy in the sliding surface "D" between the piston 1 and the cylinder 2 is reduced to improve transmission efficiencies.

<Second Embodiment>

Figure 2A:
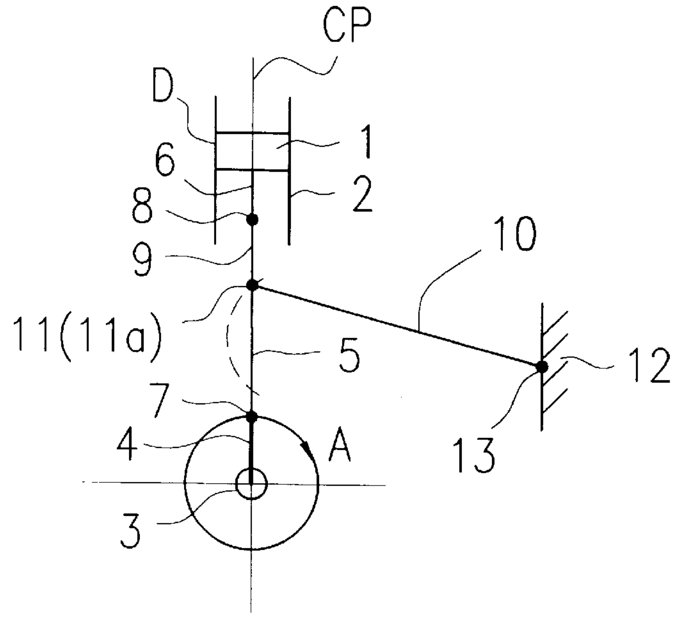
Figure 2B:
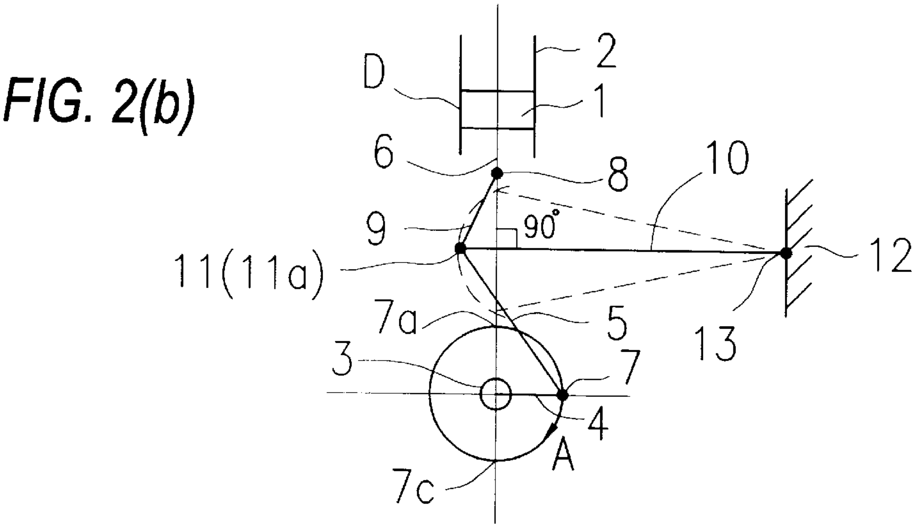
Figure 2C:
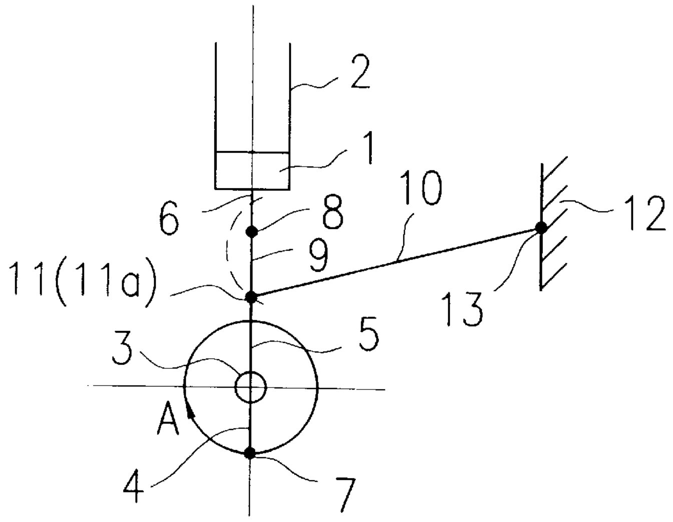

A second embodiment shown in FIGS. 2*a* to 2*c* is an example in which the crankshaft 3 is arranged in the piston axial line "Cp" of the piston portion, wherein like reference characters designate like functional portions common to the first embodiment for brevity.

In this embodiment, at the intermediate position of the piston reciprocating stroke, the inclination of the free- link axial line "C9" to the piston axial line "Cp" is also small, so that the side pressure/the frictional resistance in the sliding surface "D" is to be zero, and the connecting straight line between the top and bottom dead centers "Cb" and "Cd" of the crank pin meets approximately at a right angle with the straight line connecting the pivoting point 13 of the cross-link 10 on the crankcase 12 to the pivoting point lla on the connection rod 5, so that the load to the bearing of each pivoting point is restrained from being excessive. On the other hand, in the top and the bottom dead center, the side pressure/the frictional resistance in the sliding surface "D" is appropriately produced enabling the piston 1 to be smoothly reciprocated with extreme efficiencies, so that loss of energy in the sliding surface "D" between the piston 1 and the cylinder 2 is reduced to improve transmission efficiencies.

Figure 3A:
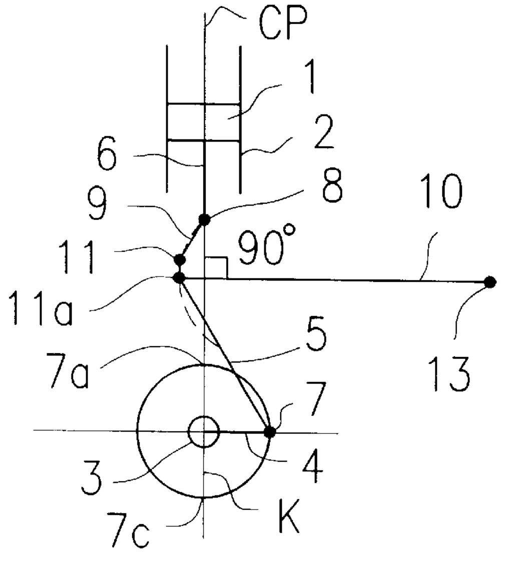
FIGS. 3*a* to 3*c* are schematic representations of the piston-crank mechanism according to a third embodiment of the present invention.
Figure 3B:
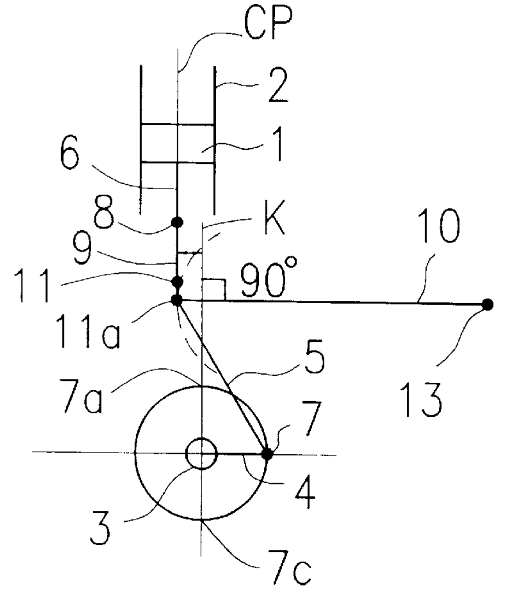
Figure 3C:
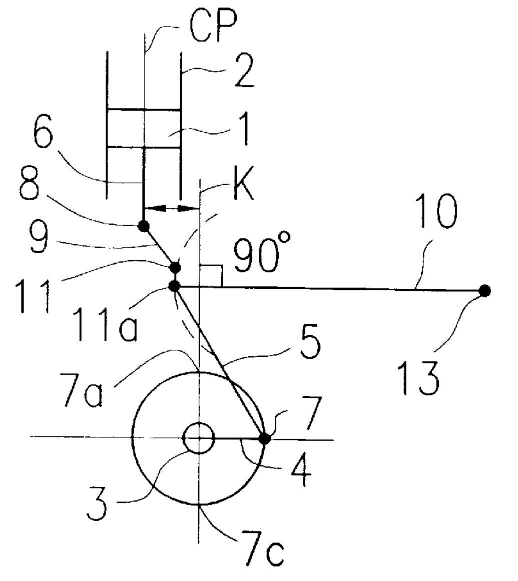

<Third Embodiment>In a third embodiment shown in FIGS. 3*a* to 3*c*, unlike the above-mentioned first and second embodiments, the pivoting point 11*a* of the cross-link 10 on the connection rod 5 and the pivoting point 11 on the free-link 9 are arranged in the same pitch circle about the pivoting point A13 on the crankcase 12 and are spaced in predetermined relationship. In this configuration, the locus of the pivoting point 11 of the cross-link 10 on the free-link 9 is vertically asymmetrical so that in an intermediate position of the crank arm stroke, the inclination of the free-link 9 is reduced. The inclination of the free-link 9 is small over the whole stroke and the inclinations can be roughly the same at the top and bottom dead centers where the inclinations are the maximums.

<Fourth Embodiment>

Figure 4:
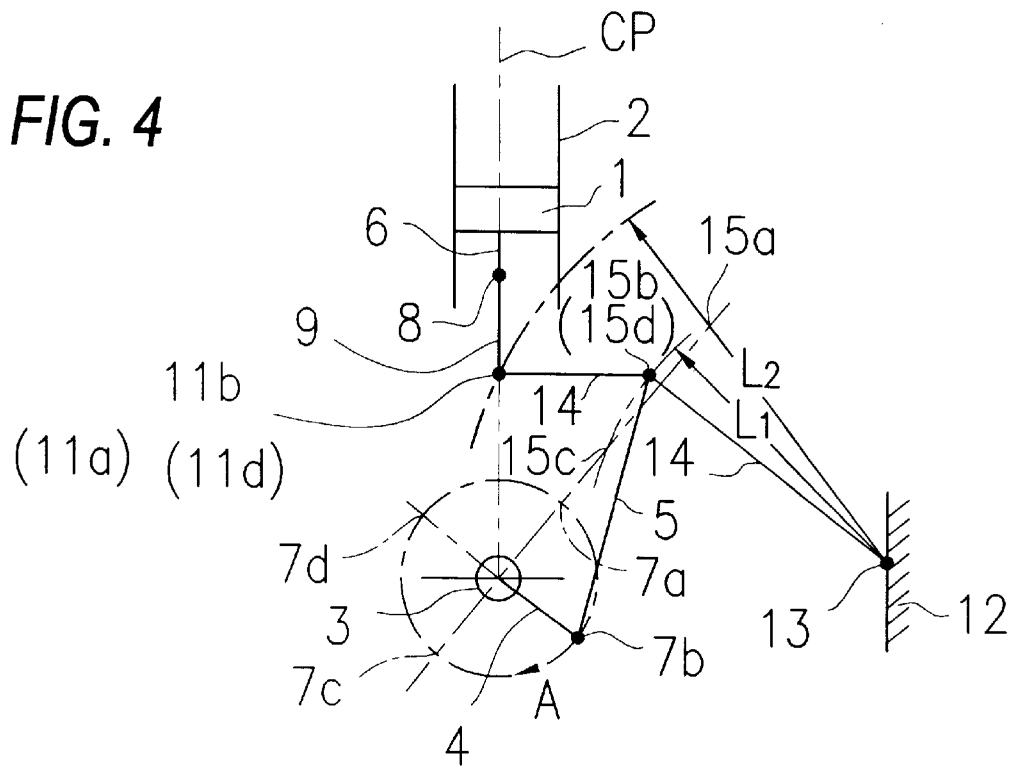
FIG. 4 is a schematic representation of the piston-crank mechanism according to a fourth embodiment of the present invention.

FIG. 4 shows a fourth embodiment of the present invention. The fourth embodiment is the same as the above-mentioned first embodiment except that the pivoting point of a cross-link 14 on the connection rod 5 is different. Therefore, like reference characters designate like functional portions common to the first embodiment and detailed description thereof is omitted.

In FIG. 4, the pivoting point 15 of the cross-link 14 on the connection rod 5 is located closer to the pivoting point 13 on the crankcase 12 than a free-link pivoting point 11 of the free-link 9 on the cross-link 14; the length "L1" of the straight line between the pivoting point 15 of the cross-link 14 on the connection rod 5 and the pivoting point 13 on the crankcase 12 is set to be smaller than the length "L2" of the straight line between the pivoting point 11 on the free-link 9 connecting toward the piston 1 and the pivoting point 13 on the crankcase 12.

In the intermediate point of the piston 1, the free-link pivoting point 11, the pivoting point 15, and the pivoting point 7 are located at 11*b* (11*d*), 15*b* (15*d*), and 7*b* (7*d*) of FIG. 4, respectively, and the piston rod 6 and the free-link 9 are in a straight line on the piston axis "Cp". In the top dead center, the pivoting point 15 and the pivoting point 7 are transferred to 15*a* and 7*a*, respectively. In the bottom dead center, the pivoting point 15 and the pivoting point 7 are transferred to 15*c* and 7*c*, respectively.

In this embodiment, by utilizing the principles of the lever, the movement of the connection rod 5 relative to the reciprocating movement of the piston 1 is reduced by approximately L1/L2 compared with that of the first embodiment while the force for driving the crank arm 4 by the connection rod 5 is increased by L2/L1. Owing to the principles of the lever, in the embodiment shown in FIG. 4, the force for rotationally driving the crankshaft 3 is furthermore increased. In addition, the states in respective processes of suction, compression, explosion, and exhaustion are the same as those shown in FIGS. 1*a* to 1*c*.

In the fourth embodiment shown in FIG. 4, the cross-link 14 and the connection rod 5 are formed as an intermediate link mechanism for transmitting the reciprocating movement of the piston portion 1, 6 to the crankshaft 3. An free-link 9 is the link for transmitting reciprocating movement of the piston thereto.

<Fifth Embodiment>

Figure 5:
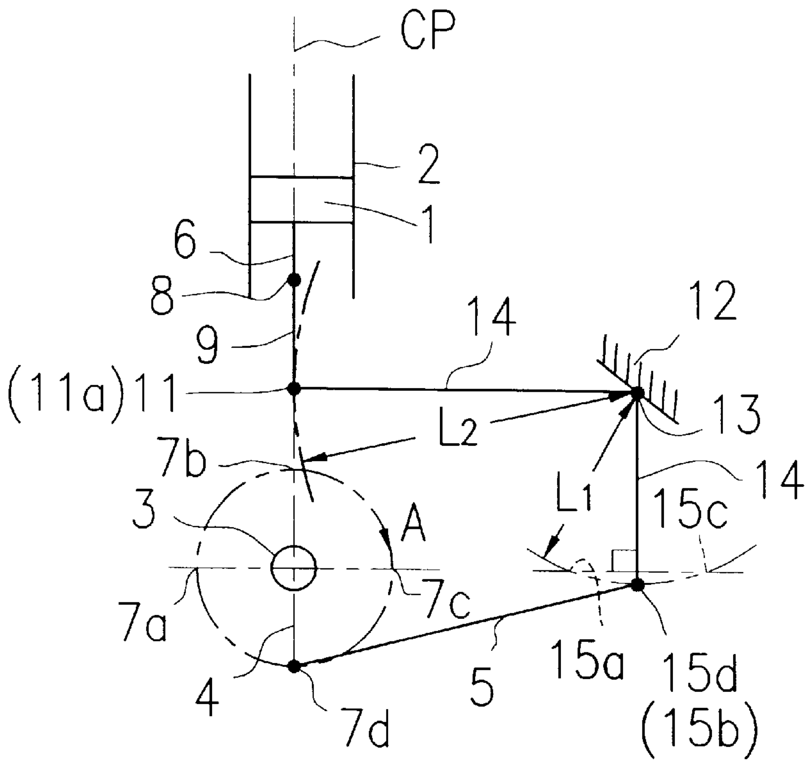
FIG. 5 is a schematic representation of the piston-crank mechanism according to a fifth embodiment of the present invention.

FIG. 5 shows a fifth embodiment of the present invention. The fifth embodiment is the same as the above-mentioned third embodiment except that the cross-link 14 is an L-shaped lever. Therefore, like reference characters designate like functional portions common to the third embodiment and detailed description thereof is omitted.

In the fifth embodiment, the length "L1" of the straight line between the pivoting point 15 of the cross-link 14 on the connection rod 5 and the pivoting point 13 on the crankcase 12 is also devised to be smaller than the length "L2" of the straight line between the pivoting point 11 on the free-link 9 connecting toward the piston 1 and the pivoting point 13 on the crankcase 12. Owing to the principles of the lever, the force for rotationally driving the crankshaft 3 is furthermore increased.

In the intermediate point of the piston 1, the inclination of the free-link 9 axial line to the piston axial line "Cp" is small, and the straight line connecting the top and bottom dead centers 7*a* and 7*c* of the crank pin 7 together meets approximately at a right angle with the line connecting the pivoting point 13 of the cross-link 14 on the crankcase 12 to the pivoting point on the connection rod 5.

In the fifth embodiment shown in FIG. 5, the cross-link 14 and the connection rod 5 form an intermediate link mechanism for transmitting reciprocating movement of the piston portion 1, 6 to the crankshaft 3.

According to the fifth embodiment, flexibility in a layout of the piston 1 and the crankshaft 3 is increased enabling the crankshaft 3 to be designed to shift far away from the axial line "Cp" of the piston 1.

<Sixth Embodiment>

Figure 6:
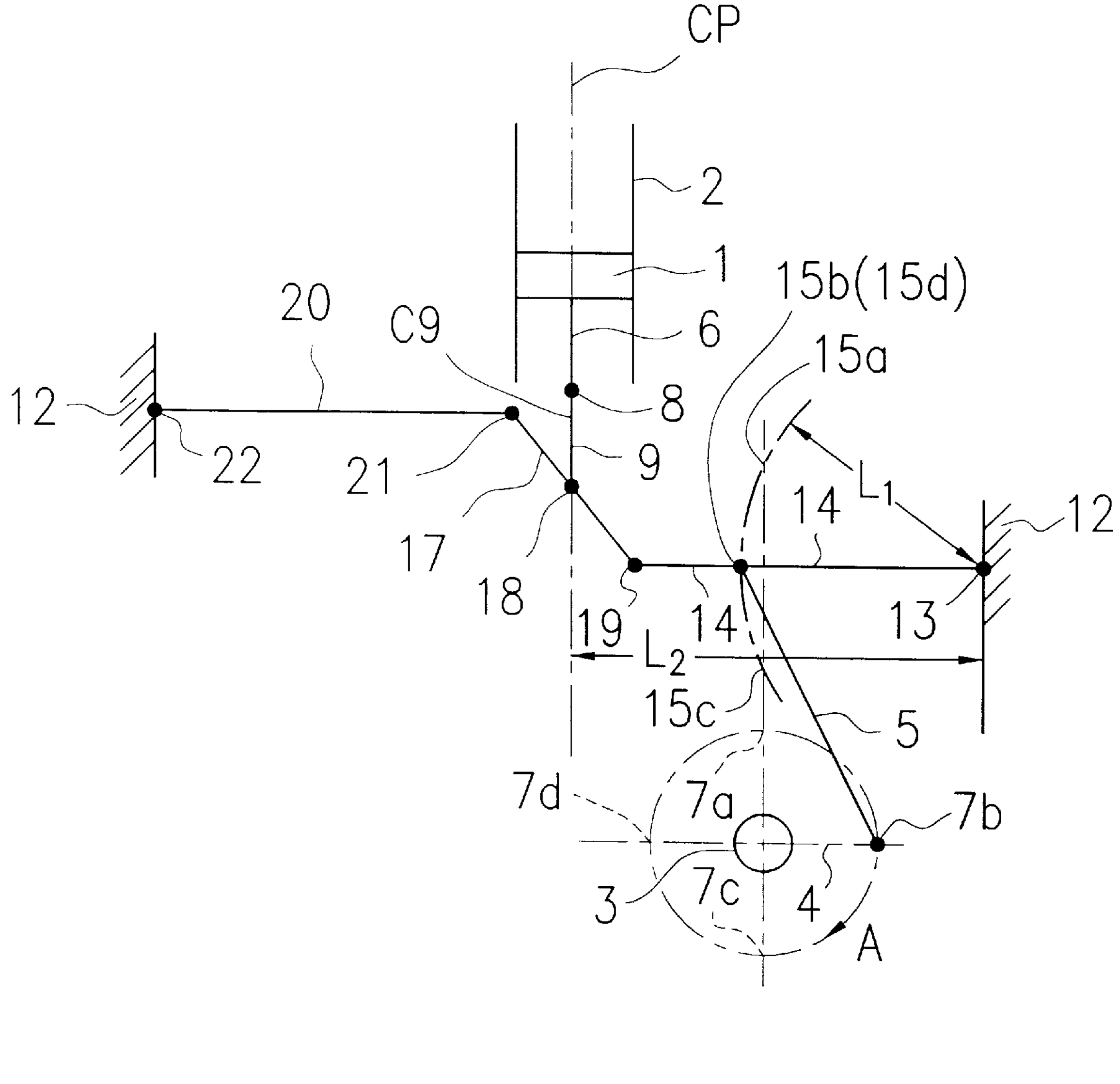
FIG. 6 is a schematic representation of the piston-crank mechanism according to a sixth embodiment of the present invention.
Figure 7A:
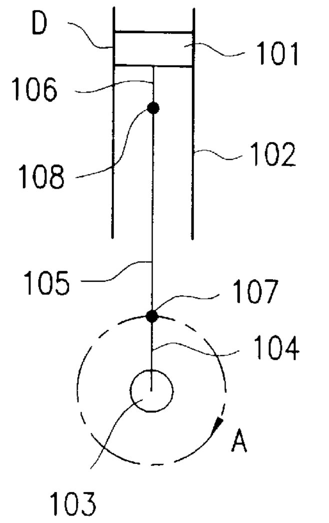
FIG. 7(a) PRIOR ART
Figure 7B:
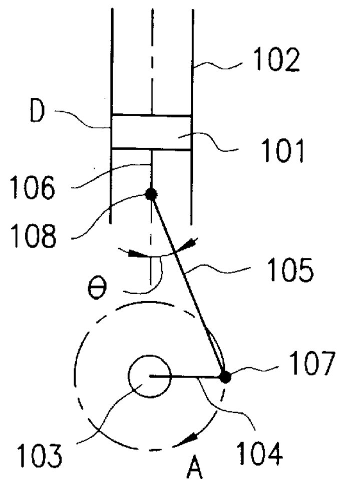
FIG. 7(b) PRIOR ART
Figure 7C:
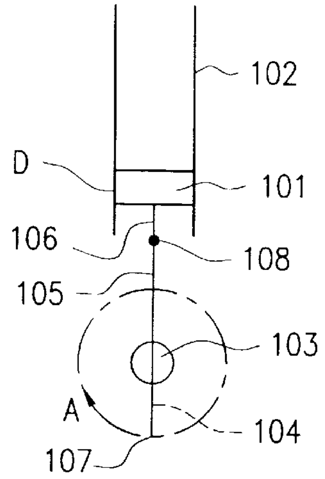
FIG. 7(c) PRIOR ART
Figure 7D:
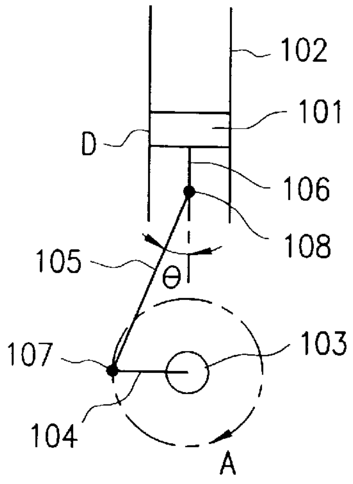
FIG. 7(d) PRIOR ART

FIG. 6 shows a sixth embodiment of the present invention. In this sixth embodiment, the relationship between the connection rod 5 and the crank arm 4 is the same as the fourth embodiment shown in FIG. 4. The crankshaft is arranged in a position not within the piston axial line "Cp".

In the sixth embodiment, the so-called parallel link mechanism is used, so that the free-link 9 is not too much separated from the piston axial line "Cp" during the reciprocating movement of the piston 1.

That is, the center point of an idler link 17 is pivoted (at a pivoting point 18) on the bottom end of the free-link 9 and the right end of the idler link 17 viewing the drawing is pivoted (at a pivoting point 19) on one end of the cross-link 14 while the other end of the idler link 17 is pivoted (at a pivoting point 21) on one end of a guide link 20. The other end of the above-mentioned guide link 20 is pivoted (at a pivoting point 22) on the crankcase 12 opposite to the crankcase 12 where the pivoting point 13 of the cross-link 14 is located.

The length of the guide link 20 (the length from the pivoting point 21 on the idler link 17 to the pivoting point 22 on the crankcase 12) is made equal to the length of the cross-link 14 (the length from the pivoting point 19 on the idler link 17 to the pivoting point 13 on the crankcase 12). The length from the free-link pivoting point 18 of the idler link 17 on the free-link 9 to the pivoting point 19 on the cross-link 14 is made equal to the length from the free-link pivoting point 18 on the free-link 9 to the pivoting point 21 on the guide link 20. In the intermediate stroke of the piston 1, the cross-link 14 and the guide link 20 meet at right angles with the piston axial line "Cp" (the straight lines between the pivoting point 19 on the idler link 17 and the pivoting point 13 on the crankcase 12, and between the pivoting point 21 on the idler link 17 and the pivoting point 22 on the crankcase 12 meet at right angles with the piston axial line "Cp"), wherein the idler link 17 is made inclined therebetween. In the parallel link mechanism formed as above, the center point of the idler link 17, i.e., the free-link pivoting point 18 moves roughly along the piston axial line "Cp" over a wide back-and-forth range of the intermediate point of the piston 1.

In the intermediate point of the piston 1, the pivoting point 15 and the pivoting point 7 are located at 15*d* (15*b*) and 7*d* (7*b*), respectively. In the top dead center, the pivoting point 15 and the pivoting point 7 are transferred to 15*a* and 7*a*, respectively while in the bottom dead center, the pivoting point 15 and the pivoting point 7 are transferred to 15*c* and 7*c* , respectively.

In the sixth embodiment shown in FIG. 6, the idler link 17, the guide link 20, the cross-link 14, and the connection rod 5 are formed as an intermediate link mechanism for transmitting the reciprocating movement of the piston portion 1, 6 to the crankshaft 3. The idler link 17 is the link for transmitting the reciprocating movement of the piston thereto.

In this embodiment, the inclination of the free-link axial line "C9" connecting the pivoting point 8 of the free-link 9 on the piston rod 6 to the pivoting point 18 on the idler link 17 roughly equals to the reciprocating direction of the piston 1 (the piston axial line "Cp" direction) over the whole reciprocating stroke of the piston 1, so that the side pressure/the friction force applied to the sliding surface "D" between the piston 1 and the cylinder 2 is extremely small over a wide stroke range of the piston 1. In the intermediate position, the connecting straight line between the top and bottom dead centers of the crank pin meets approximately at a right angle with the straight line connecting the pivoting point of the cross-link on the crankcase to the pivoting point on the connection rod, so that transmission efficiencies from the piston 1 to the crankshaft 3 are furthermore improved.

As described above in detail, in the piston-crank mechanism according to the present invention, the side pressure/the friction force applied to the sliding surface "D" between the piston 1 and the cylinder 2 is extremely small, so that loss of energy therefrom is substantially reduced to improve transmission efficiencies. Accordingly, relatively low power engines can be utilized. Selectable ranges for fuels, the pressure of fuel gas, ignition timing, combustion duration, a temperature in combustion, and so forth are extended, so that by optimum selections thereof, an increase in gasmileage, an increase in the power output, and reductions of CO, H, C, etc., in exhaust gas can be achieved.

The engine can manage by comparatively small driving torque enabling an idling rotational speed to be lowered, so that adequate output power can be obtained even by using lean mixtures and alternative fuels.

In the embodiments described above, cases of internal combustion engines are described; however it can be clear that the same effects can be obtained by applying the present invention to other engines.

In the embodiments described above, in the intermediate link mechanism used are the cross-links 10 and 14 pivoted on the crankcase as links moving along predetermined loci in accordance with the reciprocating sliding stroke of the piston portion relative to the crankcase surrounding the crankshaft; however the cross-link may be guided by a grooved cam fixed to the crankcase, for example. The movement locus of the cross-link is not necessarily an arc.

As described above, according to the present invention, since in an intermediate position of the reciprocating stroke of the piston portion or in the vicinity thereof, the inclination of the axial line of the free link extended from the piston portion to the reciprocating direction of the piston portion (the piston axial line "Cp" direction) is to be small while the line connecting the top and bottom dead centers of the crank pin together meets approximately at a right angle with the line connecting the pivoting point of the cross-link on the crankcase to the pivoting point thereof on the connection rod, in the intermediate position of the reciprocating stroke of the piston portion or in the vicinity thereof, the side pressure/the sliding friction between the piston and the cylinder is extremely reduced, so that the piston slides smoothly while at the top and bottom dead centers, some amount of the side pressure/the frictional force is produced, so that the level of wear and tear of the piston and the cylinder is reduced, improving transmission efficiencies as well.

What is claimed is:

1. A piston-crank mechanism for converting reciprocating movement of a piston into rotational movement of a crankshaft, said piston-crank mechanism comprising:

a piston portion reciprocating and sliding within a cylinder;

a free-link, one end of said free-link being pivoted on said piston portion via a piston pin arranged in the vicinity of the axial line of said piston portion; and an intermediate link mechanism formed of a plurality of links for transferring reciprocating movement of said piston portion for conversion into rotational movement of the crankshaft, said intermediate link mechanism being connected to said free-link at a free-link pivoting point formed on the other end of said free-link while said intermediate link mechanism being swingably connected to a crank arm with a crank pin of the crank arm, the crank arm being rotatable with the crankshaft in unison, wherein said intermediate link mechanism comprises a connection rod, one end of the connection rod being swingably connected to the crank arm with the crank pin, and a cross-link swingably connected to the other end of the connection rod and to the free-link at the free-link pivoting point while the cross-link being pivoted on a crankcase, and wherein movement of the cross-link is restrained by swinging movement thereof about the pivoting point on the crankcase, so that in an intermediate position of reciprocating movement of the piston, the straight line connecting the top and bottom dead centers of the crank pin together meets approximately at a right angle with the straight line connecting the pivoting point of the cross-link on the crankcase to the pivoting point thereof on the connection rod.

2. A piston-crank mechanism for converting reciprocating movement of a piston to rotational movement of a crankshaft, said piston-crank mechanism comprising:

a piston portion reciprocating and sliding within a cylinder;

a free-link, one end of said free-link being pivoted on said piston portion via a piston pin arranged in the vicinity of the axial line of said piston portion; and an intermediate link mechanism formed of a plurality of links for transferring reciprocating movement of said piston portion for conversion into rotational movement of the crankshaft, said intermediate link mechanism being connected to a free-link pivoting point formed on the other end of said free-link while said intermediate link mechanism being swingablly connected to a crank arm with a crank pin of the crank arm, the crank arm being rotatable with the crankshaft in unison, wherein said intermediate link mechanism comprises a connection rod, one end of the connection rod being swingablly connected to the crank arm with the crank pin, and a cross-link swingablly connected to the other end of the connection rod and to the free-link at the free-link pivoting point while the cross-link being pivoted on a crankcase, and wherein movement of the cross-link is restrained by the swinging movement thereof about the pivoting point on the crankcase, so that in an intermediate position of reciprocating movement of the piston, the inclination of said free-link to the piston axial line is maintained to be small while the straight line connecting the top and bottom dead centers of the crank pin together meets approximately at a right angle with the straight line connecting the pivoting point of the cross-link on the crankcase to the pivoting point on the connection rod.

3. A piston-crank mechanism for converting reciprocating movement of a piston into rotational movement of a crankshaft, said piston-crank mechanism comprising:

a piston portion reciprocating and sliding within a cylinder;

a free-link, one end of said free-link being pivoted on said piston portion via a piston pin arranged in the vicinity of the axial line of said piston portion;

a cross-link, one end of said cross-link being pivoted on said free-link while the other end of said cross-link being pivoted on a crankcase surrounding the crankshaft; and a connection rod, one end of said connection rod being pivoted at an arbitrary position other than the pivoting point of said cross-link on the crankcase while the other end of said connection rod being pivoted on a crank arm being rotatable with the crankshaft in unison, wherein movement of the cross-link is restrained by swinging movement thereof about the pivoting point on the crankcase, so that in an intermediate position of reciprocating movement of the piston, the inclination of said free-link to the piston axial line is maintained to be small while the straight line connecting the top and bottom dead centers of the crank pin together meets approximately at a right angle with the straight line connecting the pivoting point of the cross-link on the crankcase to the pivoting point thereof on the connection rod.

4. A piston-crank mechanism according to any one of claims 2 and 3, wherein a ratio of the distance between the free-link pivoting point of the cross-link and the pivoting point on the crankcase/the stroke of the piston is set to be large, so that in an intermediate position of reciprocating movement of the piston, the inclination of said free-link to the piston axial line is set to be small.

5. A piston-crank mechanism according to any one of claims 1 to 3, wherein a ratio of the distance between the free-link pivoting point of the cross-link and the pivoting point on the crankcase/the distance between the pivoting point of the cross-link on the connection rod and the pivoting point on the crankcase is set to be large, so that the length of the crank arm is set to be small.

6. A piston-crank mechanism according to any one of claims 1 to 3, wherein the axial line of the piston is not parallel with the straight line connecting the top and bottom dead centers of the crank pin together.

7. A piston-crank mechanism according to any one of claims 1 to 3, wherein the free-link pivoting point of the cross-link and the pivoting point thereof on the connection rod are arranged on the same pitch circle about the pivoting point on the crankcase and are spaced in predetermined relationship.

8. A piston-crank mechanism according to any one of claims 1, 2, and 3, wherein the crankshaft is arranged between the axial line of the piston and the pivoting point of said cross-link on the crankcase.

* * * * *